United States Patent [19]

Wolf et al.

[11] Patent Number: 4,903,948
[45] Date of Patent: Feb. 27, 1990

[54] METALLURGICAL VESSEL

[75] Inventors: Josef Wolf, Moers-Schwafheim; Fritz-Jürgen Strunck, Voerde, both of Fed. Rep. of Germany

[73] Assignee: Thyssen Stahl AG, Duisburg, Fed. Rep. of Germany

[21] Appl. No.: 283,396

[22] Filed: Dec. 12, 1988

[30] Foreign Application Priority Data

Dec. 17, 1987 [DE] Fed. Rep. of Germany ....... 3742861

[51] Int. Cl.$^4$ ............................................. C21C 5/48
[52] U.S. Cl. .................................. 266/220; 266/217; 373/85
[58] Field of Search ................ 266/220, 217; 222/603; 373/85, 86

[56] References Cited

U.S. PATENT DOCUMENTS 1,763,248  6/1930  Moore ................................. 266/220
4,538,795  9/1985  LaBate ................................ 266/220

Primary Examiner—S. Kastler
Attorney, Agent, or Firm—Sprung Horn Kramer & Woods

[57] ABSTRACT

The invention comprises a metallurgical vessel, more particularly an electric arc furnace, having means for introducing inert stirring (purging) gases into a metal melt. The vessel has an outer sheet metal jacket, a refractory lining, and means for introducing stirring gases into the melt being disposed in the furnace hearth, which comprises a permanent lining of refractory bricks and a wear lining of a refractory ramming mass. The means for introducing the stirring gases are disposed in the permanent lining.

10 Claims, 4 Drawing Sheets

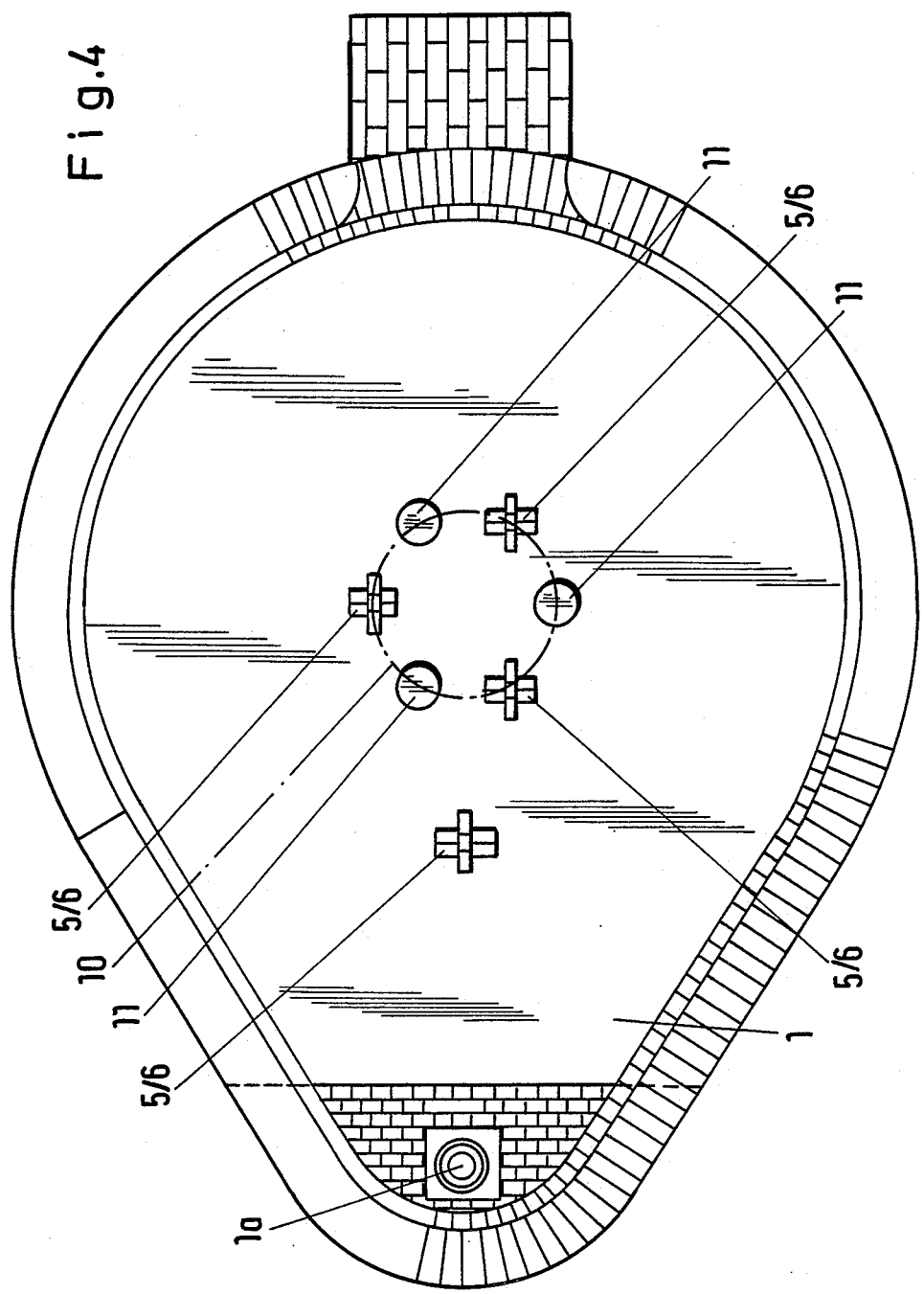

METALLURGICAL VESSEL

BACKGROUND OF THE INVENTION

In the manufacture of steels it has for many years been practice to treat melts with stirring gases in a secondary metallurgical processing. Metallurgical vessels in which such treatments are performed are ladles, furnaces and converters. In the making of steel in electric arc furnaces it is also known to stir up the molten metal, thereby purging and intensifying metallurgical reactions by introducing inert gases into the molten metal through nozzles being disposed in the furnace hearth or bottom. For example, in the process disclosed in German Offenlegungsschrift 1 583 221 gas-permeable refractory bricks are disposed in the area below the position of the electrodes in the furnace hearth. However, gas-permeable refractory bricks have the disadvantage of a short service life in comparison with the adjoining refractory hearth lining.

In the electric arc furnace disclosed in the published European patent application 0 200 405 the melt process can be boosted by introducing a stirring gas into the melt through a small tube in the furnace bottom. However, no concrete details are mentioned concerning the construction of the small tube or the furnace bottom. The European patent application 0 240 998 discloses a small tube extending through both the permanent lining and the wear lining. The small tube is therefore directly exposed to wear by the molten metal melt in the furnace.

In the case of stirring (purging) in an electric arc furnace other important aspects are the geometrical arrangement of the small gas tubes in the furnace bottom and the formation of the stirring spot in view of the circulation of the molten metal to be achieved and the need for the arcs to be adjustable to burn quietly and uniformly. The construction of the stirring spot depends on the quantity of the gas and the kind of distribution of the gas bubbles emerging at the boundary surface between the furnace bottom and the molten metal.

In the German Journal "Stahl und Eisen" 106, 1986, No. 19, pages 1003 to 1005, the introduction of argon as a stirring gas into the melt through a spirally shaped small tube disposed in the constantly refilled tapping channel of the furnace is described. This is an experimental arrangement stated to have the disadvantage that the small stirring gas tube extending loosely through the filling material leads to a weakening of the tapping filling. This publication also states that it was a troublesome and time-wasting operation to have to reintroduce the small stirring gas tubes every time into the tapping channel, so that a stirring set was developed. However, the publication gives no concrete details of the construction of the stirring set.

German patent 3 318 422 discloses a stirring gas arrangement in the wall of a melt-containing vessel, wherein a small stirring gas tube is mounted for longitudinal displacement in the vessel wall The main objective of this arrangement is to enable the stirring gas arrangement to be restored to operation in a simple and quick manner by moving up the small stirring gas tube when the arrangement has become unusable due to molten metal freezing in the tube. When this arrangement is used in the hearth/bottom in which the wear lining consists of a refractory ramming mass, it must be expected that the emerging gas over the burnt-back small stirring gas tube will cause funnel shaped washed out places in the rammed hearth/bottom, so that it is of low durability. Another disadvantage will be the deficient sealing of the advanceable small stirring gas tube in the bottom brick, resulting in a leakage and the loss of a proportion of the stirring gas.

It is an object of the invention to provide a metallurgical vessel, more particularly an electric arc furnace, in which both the gas stirring device and also the lining of the furnace hearth or bottom have a long service life. Furthermore, with an improved melt stirring effect, the large area introduction of the stirring gas into the molten metal achieves a formation of the stirring spot which ensures that the arcs burn uniformly and quietly.

DESCRIPTION OF THE INVENTION

The invention comprises a metallurgical vessel, more particularly an electric arc furnace having means for introducing stirring (purging) gases into the metal melt. The vessel has an outer sheet metal jacket, and a refractory lining. The means for introducing the stirring gases are disposed in the furnace hearth, which has a permanent lining of refractory bricks and a wear lining of a refractory rammed mass.

The stirring gas is conducted through the furnace lining, made of a refractory ramming mass, before the gas enters the melt. This enables the wear lining to be cooled by means of the stirring gas, resulting in an appreciable enhancement of the durability of the furnace hearth.

The stirring spot in the surface of the molten bath can be increased, for example, from 400 mm in diameter to about 1200 mm in diameter, as a result of the stirring-/purging gas being suitably guided by the deflector plate which may be disposed in the wear lining above the stirring means. With an improved stirring effect in the melt the bath surface itself becomes calmer and the stirring spot larger and flatter, so that the arcs burn more uniformly and quietly. Moreover, the distribution of the gas bubbles over a larger area prevents spashed steel from being hurled out, thus preventing increased electrode consumption.

When worn to about 90%, the wear lining can be renewed in its hot or cold condition and without having to replace the stirring means. This is only necessary when the wear lining of the furnace or vessel has to be renewed. The result is an appreciable reduction of costs.

According to another feature of the invention the metallurgical vessel has stirring means consisting of small gas tubes. Disposed in the permanent lining are bottom bricks formed with an aperture into which the small gas tubes extend through an opening in the bottom plate. The inner diameter d of the small tubes preferably being 1 to 8 mm. The ratio between the diameter D of the deflector plate and the internal diameter d of the small tubes should perferably be in the range of 40:1 to 100:1. The distance A of the deflector plate from the bottom brick should be twice to three times the inner diameter d of the small gas tubes.

The gas stirring arrangement according to the invention is suitable not only for the hearth of electric furnaces, but can also advantageously be used for other metallurgical vessels, such as ladles and converters, on condition that the bottoms of such metallurgical vessels comprise a permanent lining of refractory bricks and a wear lining of a refractory ramming mass. In these cases advantageously the stirring device takes the form of a refractory ceramic brick having an associated refractory seating block and is disposed in the permanent lining. In this emodiment the distance A of the deflector plate from the stirring device is 5 to 50 mm.

According to another feature of the invention, an electric arc furnace having a substantially circular hearth comprises three stirring devices disposed on the electrode pitch circle, each in the center between the electrodes, and a further stirring device being disposed centrally in the hearth.

In contrast, in the case of an electric arc furnace having an eccentric bottom tap, the further stirring device is disposed outside the electrode pitch circle in the zone of the bottom tap. The introduction of stirring gas into the somewhat cooler zone results in an improved melting of the scrap lying at that place.

BRIEF DESCRIPTION OF THE DRAWINGS

Embodiments of the invention will now be explained with reference to the drawings.

FIG. 4 is a plan view of the hearth with eccentric bottom tap in a second arrangement of the stirring device

DETAILED DESCRIPTION OF THE INVENTION

Figure 1:
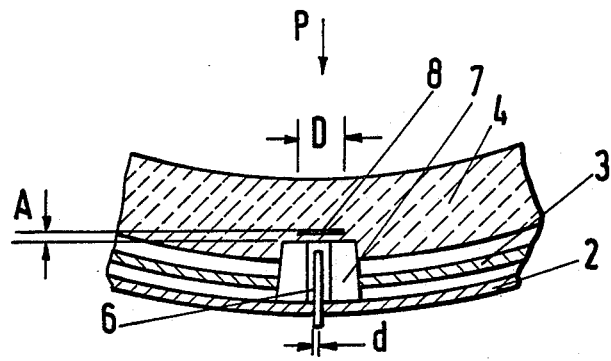
FIG. 1 is a partial section through a hearth of an electric arc furnace in a first embodiment of the stirring device.
Figure 2:
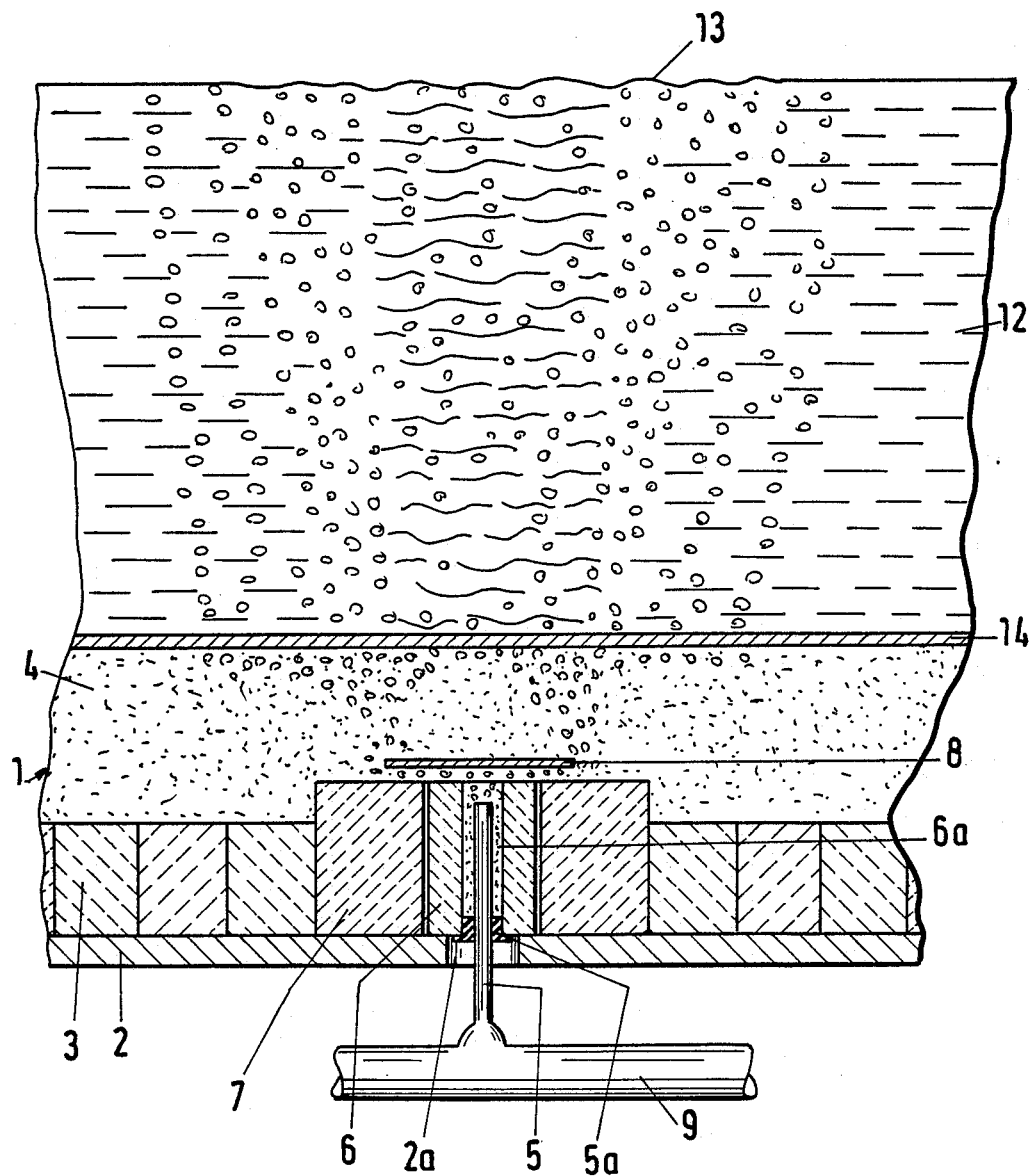
FIG. 2 is a partial section corresponding to FIG. 1 but in enlarged scale.

FIGS. 1 and 2 show in partial sections a hearth 1 of an electric arc furnace. A permanent lining 3 of close-masonry refractory bricks is disposed on a furnace bottom plate 2. A furnace bottom wear lining 4 of a refractory ramming mass is disposed above the permanent lining 3. A suitable dry ramming mass, for example, is one of sintered magnesite having a high CaO and a reduced $Fe_2O_3$ content and the following composition (in % by weight):

| | |
|---|---|
| 76% MgO | |
| 19% CaO | |
| 0.5% $Al_2O_3$ | |
| 0.5% $SiO_2$ | |
| 3.5% $Fe_2O_3$ | |
| Binding: | ceramic; |
| Average grain size: | 8 mm; |
| Bulk weight: | 2.3 kg/dm$^3$; |
| Apparent density after drying: 200° C.: | 2.7 g/cm$^3$; |
| Compressive strength after annealing at 1300° C.: | >10 N/mm$^2$; |
| Compressive strength after annealing at 1600° C.: | >20 N/mm$^2$; |
| Thermal conductivity at 1000° C. | 1.3 W/m.K |
| Temperature limit of utilization: | 1750° C. |

Figure 3:
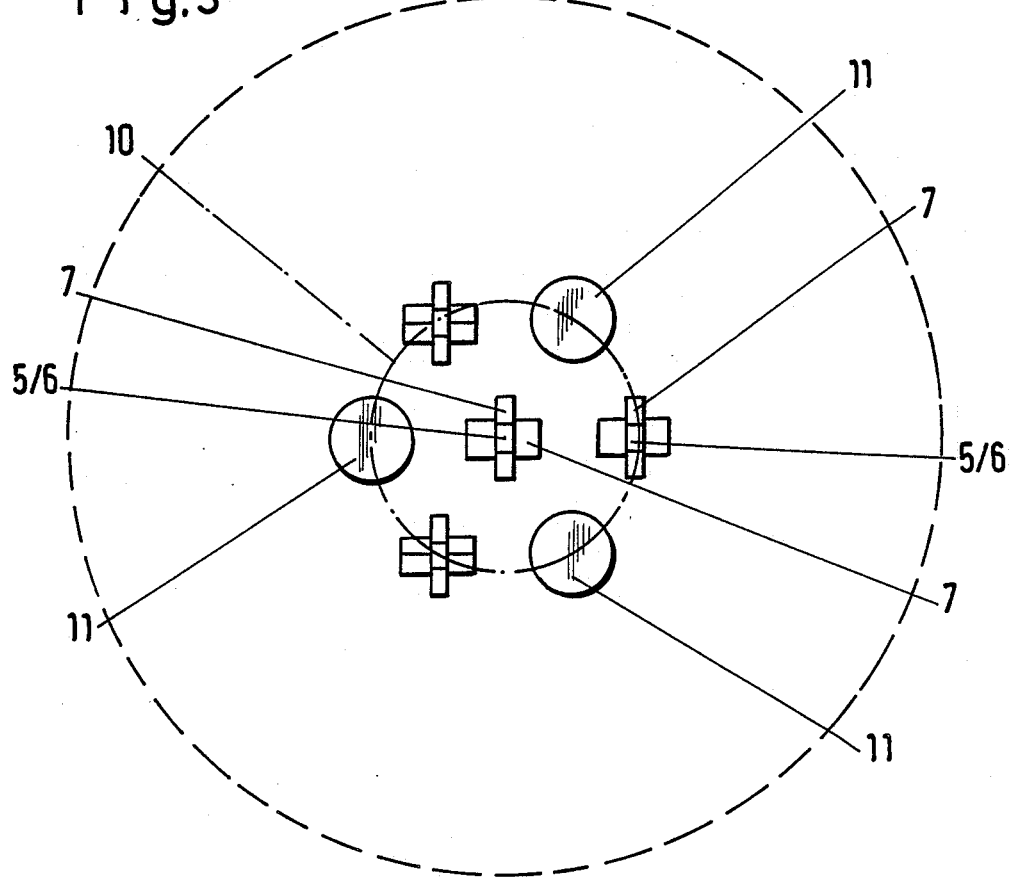
FIG. 3 is a plan view of the hearth, taken in the direction of the arrow P in FIG. 1, of a first arrangement of the stirring device.

Refractory bottom bricks 6 formed with an aperture 6a are inserted in the dense masonry of the permanent lining 3. For support of the longitudinal sides, the bottom bricks 6 are enclosed by a total of six bottom bricks 7 without apertures (FIG. 3).

Through an aperture 2a in the bottom plate 2 a small stirring gas tube 5 extends from below into the aperture 6a in the bottom brick 6. Sealing is provided by seal 5a, the free gap between the small tube 5 and the aperture 6a also being filled with mortar. A deflector plate 8 is disposed in the wear lining 4 above the bottom brick 6. With an internal diameter d of the small stirring tube 5 of 4.8 mm the diameter D of the deflector plate 8 is 250 mm, while the distance A of the deflector plate 8 forming the bottom brick 6 is about 10 mm (FIGS. 1 and 2).

The stirring gas, supplied via a supply pipe 9 to the small gas tubes 5, enters the wear lining 4 of a refractory ramming mass at a pressure of 1.5–2.5 bar with the furnace filled, 1 bar if the furnace is empty. The stirring gas is uniformly distributed by the deflector plate 8 and on the surface of the wear lining 4 enters the metal melt 2 and forms a stirring spot 13 on its surface. As it passes through the wear lining 4 the stirring gas cools the refractory ramming mass. The diameter of the stirring spot 13 in the surface of the bath of molten metal is determined firstly by the size and arrangement of the deflector plate 8 and secondly by the density and thickness of the sintered layer 14 of the wear lining. The deflector plate distributes the merging gas bubbles over a larger outlet area, so that the surface of the molten bath as a whole becomes calmer. Fewer splashes of metal emerge from the surface of the molten bath. The electrodes 11 (not shown) above the surface of the molten bath are less affected by metal splashes. The overall result is that the arcs burn more uniformly and quietly (FIG. 2).

The deflector plate 8 prevents the ramming mass wear lining from being blown through, with consequent formation of funnel shaped washed out places, which cause premature wear in the stirring zone. Furthermore the distribution of the gas bubbles over a wide area produces in the ramming mass a strong cooling effect which substantially enhances the service life of the hearth.

As shown in FIG. 3, four stirring devices 5,6 are disposed in the electric arc furnace hearth 1, of which three are disposed on the electrode pitch circle 10, each in the middle between the position of the electrodes 11 projected on the furnace hearth. A further device 5,6 is disposed centrally in the hearth 1. This arrangement results in a particularly satisfactory stirring of the bath and intensification of the metallurgical reactions in an electric arc furnace.

FIG. 4 shows the hearth 1 of an electric arc furnace having an eccentric bottom tap 1a. As in the case of the hearth illustrated in FIG. 3, three stirring devices 5,6 are disposed on the electrode pitch circle 10, each in the middle between the position of the electrodes 11 projected on the furnace hearth. In this hearth, however, a further stirring device 5,6 is advantageously disposed in the zone of the hearth 1 adjoining the bottom tap 1a. Improved scrap melting can be more particularly achieved in this zone by the introduction of stirring gas.

Figure 5:
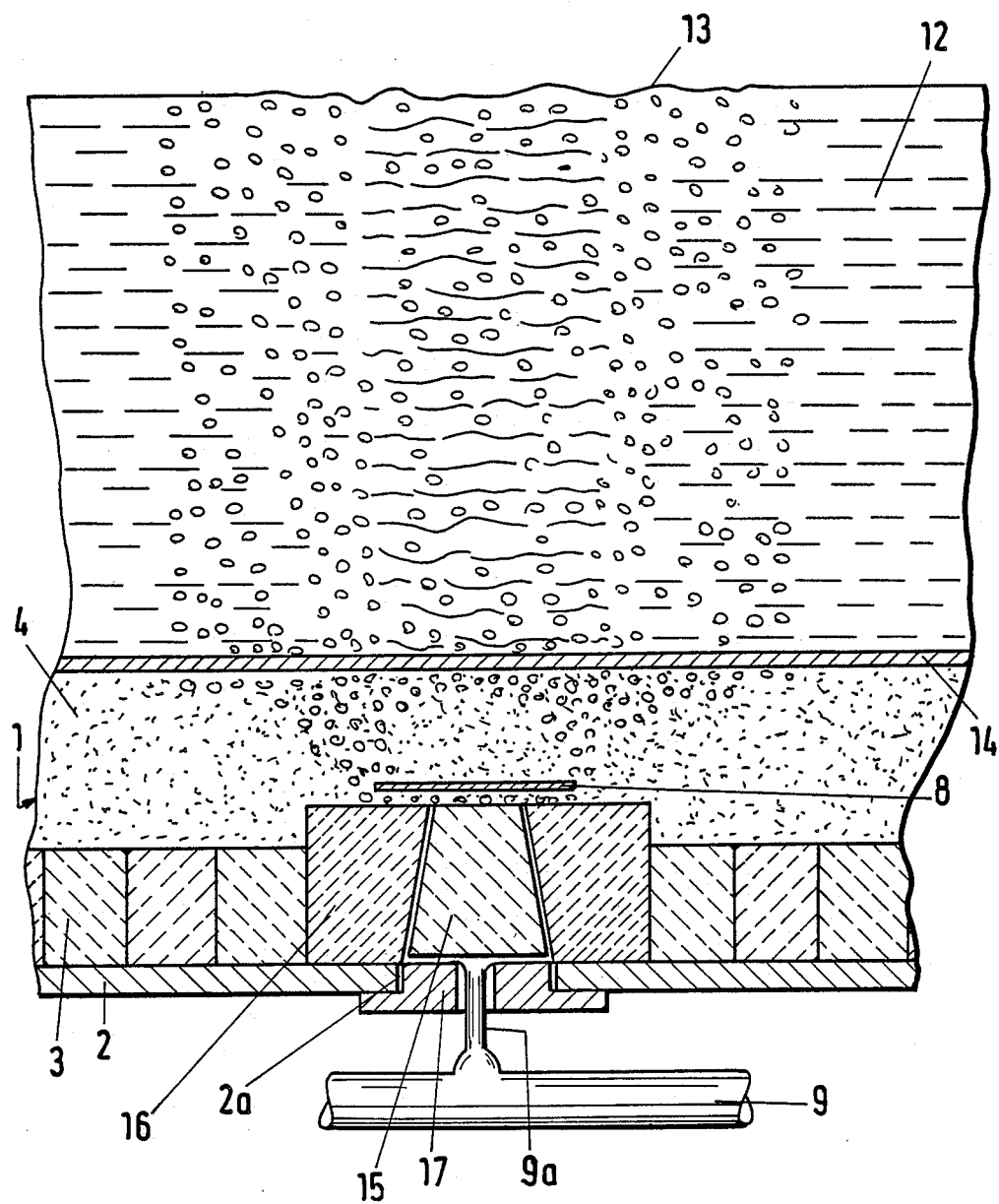
FIG. 5 is a partial section in enlarged scale of a second embodiment of the stirring device.

A second stirring device accoring to the invention is explained in FIG. 5. As in FIG. 2, the hearth of an electric arc furnace is denoted by the reference 1.

A permanent lining 3 of dense masonry refractory bricks is disposed on a bottom plate 2. A wear lining 4 of a refractory ramming mass is disposed above the back lining. The stirring device comprises a sheet metal jacketed refractory ceramic gas stirring plug with gas supply pipe 9a. The conical plug 15, which is disposed in a refractory seating block 16, is introduced through an opening 2a in the bottom plate 2 and retained by a flange 17 secured to the bottom plate 2. A deflector plate 8 is disposed in the wear lining 4 above the plug 15 and at a distance of about 30 mm from the top edge of the plug 15 and the seating block 16. As shown in FIG. 5, the diameter of the deflector plate 8 is selected larger than the mallest diameter of the conical plug 15. As already described in relation to the embodiment illustrated in FIG. 2, the stirring gas is conducted via the main supply pipe 9 and the particular supply pipe 9a to the plug 15 and enters the wear lining 4 of a refractory ramming mass, thereby cooling the refractory ramming mass of the wear lining 4. Emerging gas bubbles are distributed by the deflector plate over a large outlet area, so that a stirring spot 13 of a large diameter is produced on the surface of the molten metal bath, and as a result the surface of the molten metal bath becomes calmer.

In the embodiments described, the deflector plate 8 is shown in the form of a flat disc. However, it can also be hat-shaped and can be provided with bores. By this means the distribution of the gas bubbles in the metal melt and the formation of the stirring place can be influenced positively.

We claim:

1. A metallurgical vessel for the treatment of metal melts having means for introducing stirring gases into the metal melt, the vessel having an outer sheet metal jacket, a refractory lining, a stirring device disposed in the furnace hearth or bottom, the furnace hearth or bottom comprising a permanent lining of refractory bricks and a wear lining of a refractoring rammed mass, wherein the stirring device is disposed in the permanent lining, and a deflector place is disposed in the wear lining above the stirring device.

2. A metallurgical vessel according to claim 1 wherein the stirring device consists of small gas tubes and disposed in the permanent lining are bottom bricks formed with an aperture into which the small gas tubes extend through an opening in the bottom plate.

3. A metallurgical vessel according to claim 2 wherein the inner diameter d of the small gas tubes is 1 to 8 mm.

4. A metallurgical vessel according to claims 1 wherein the ratio between the diameter D of the deflector plate and the internal diameter d of the small tubes is in the range of 40:1 to 100:1.

5. A metallurgical vessel according to claims 1 wherein the distance A of the deflector plate from the bottom brick is twice to three times the inner diameter d of the small gas tubes.

6. A metallurgical vessel according to claim 1 wherein the stirring device has the form of a refractory ceramic gas stirring plug which sits in an associated refractory seating block and is disposed in the permanent lining.

7. A metallurgical vessel according to claims 1 wherein the distance A of the deflector plate from the gasstirring plug is 5 to 50 mm.

8. A metallurgical vessel for electric arc furnaces according to claim 1 wherein three stirring devices are disposed on the electrode pitch circle, each in the center between the position of electrodes projected on the furnace hearth and a further stirring device being disposed centrally in the furnace hearth.

9. A metallurgical vessel for electric arc furnaces having an eccentric bottom tap according to claim 1 wherein three stirring devices are disposed on an electrode pitch circle each centrally between the positions of electrodes projected on the furnace hearth and a further stirring device is disposed outside the electrode pitch circle in the zone of the bottom tap.

10. A metallurgical vessel according to claim 1, wherein the vessel is an electric arc furnace.

* * * * *